Patented May 19, 1925.

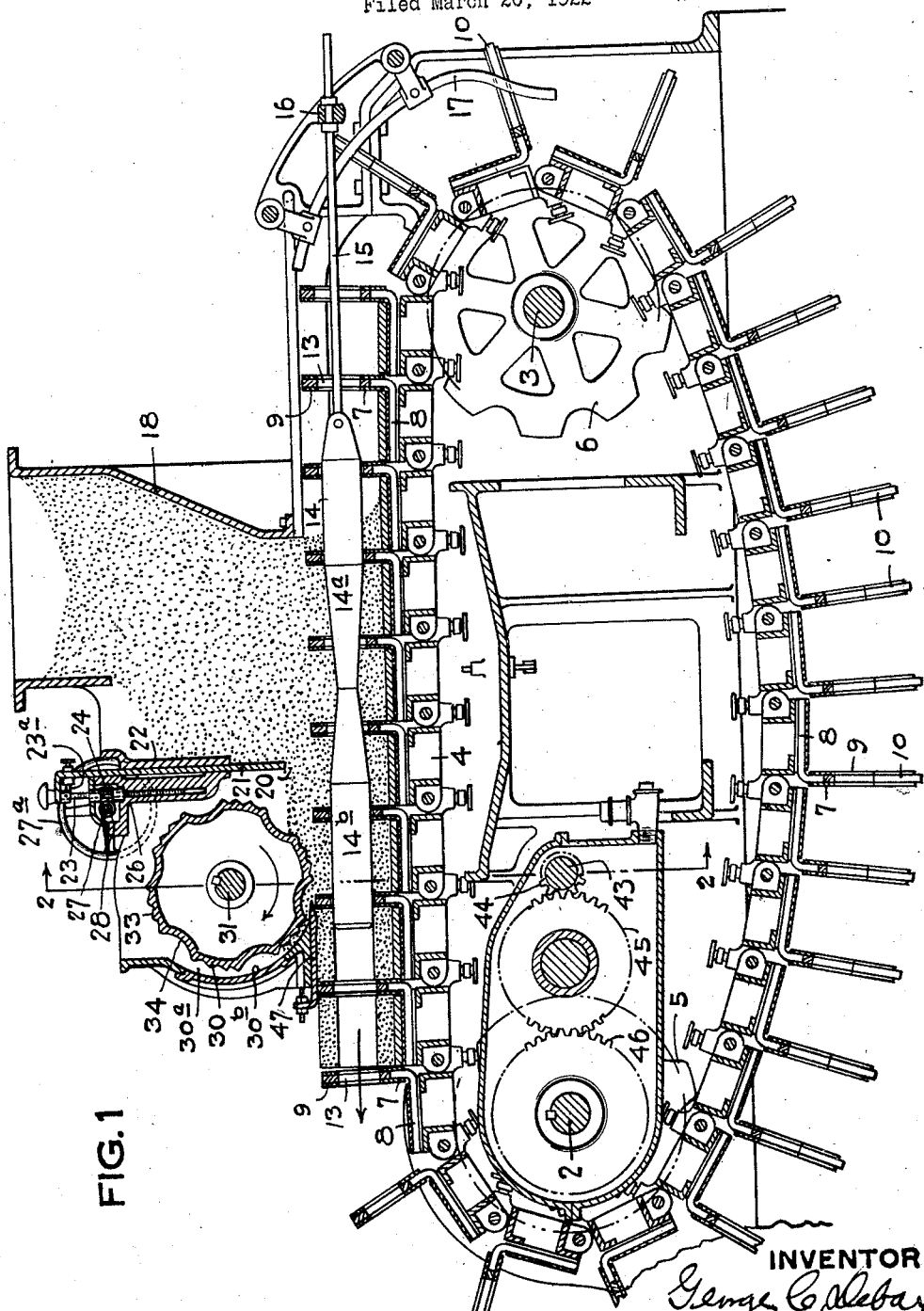

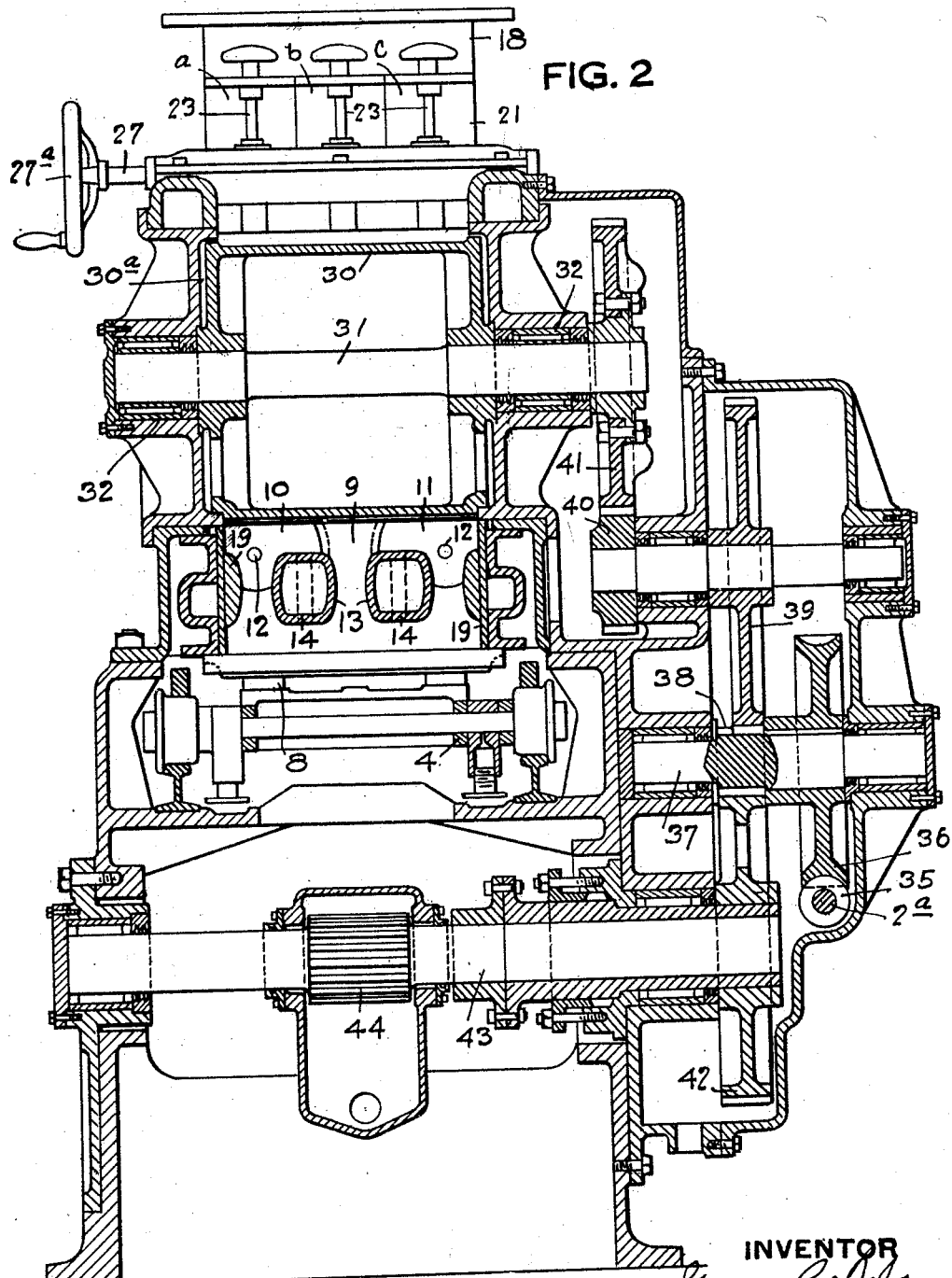

1,538,425

UNITED STATES PATENT OFFICE.

GEORGE C. DEBAY, OF SPRINGDALE, PENNSYLVANIA.

MACHINE FOR CORED BUILDING BLOCKS OF PLASTIC MATERIAL.

Application filed March 20, 1922. Serial No. 545,163.

*To all whom it may concern:*

Be it known that I, GEORGE C. DEBAY, a citizen of the United States, and resident of Springdale, in the county of Allegheny and State of Pennsylvania, have invented a new and useful Improvement in Machines for Cored Building Blocks of Plastic Material; and I do hereby declare the following to be a full, clear, and exact description thereof.

My invention relates to machines for making cored or solid building blocks of plastic material.

In Letters Patent of the United States, No. 1,362,928, granted to me on the 21st day of December, 1920, I have illustrated and described a machine of this character, and the object of the present invention is to provide for the more efficient filling of the molds and compacting the material therein to obtain a dense compact block which will be strong and durable and stand up against the compression strains to which such blocks are subjected when in use.

In the accompanying drawings, Fig. 1 is a longitudinal section of a machine similar to that described in said Letters Patent, showing my invention applied thereto; and Fig. 2 is an enlarged cross section on the line 2—2, Fig. 1.

In the drawings the numeral 2 designates a shaft mounted in suitable bearings in the frame, said shaft being driven through gearing hereinafter described. The shaft 3 is mounted in suitable bearings in the frame, and said shaft is parallel with the shaft 2 and in line therewith.

An endless conveyer or chain 4 travels on the sprocket-wheels 5 and 6 mounted on the shafts 2 and 3, respectively. Secured to the endless chain 4 are the mold-members 7 which form the bottom 8 and one of the sides 9 of the mold. The mold-members are so mounted on the endless chain 4 as to have the necessary flexibility in passing around the wheels 5 and 6, as indicated in Fig. 1.

The side-plate 9 of each mold-member 7 has the upper portion made in two sections 10 and 11 hinged as at 12, so as to be free to swing vertically. The side portion 9 and the swinging sections 10 and 11 are cut away to form in conjunction with each other the openings 13.

Core-bars 14 are connected to the rods 15 secured in the cross-bar 16, and said core-bars pass through the openings 13 in the mold-members as clearly indicated in Fig. 1, the number of said core-bars corresponding to the number of openings 13. These core-bars vary in cross-sectional area, having the thin or attenuated portions $14^a$ and the full sized portions $14^b$ which fit snugly within the openings 13 of the mold members, the increase in cross-sectional area of said core-bars being gradual.

Guides 17 are provided for engaging the swinging sections 10 and 11 of the mold-members to swing them over in position to enclose the core-bars, all as described and illustrated in the above recited Letters Patent.

A hopper 18 is provided, to which the material from which the blocks are to be made is delivered. This hopper is supported on a frame above the molds as they travel forward, and said hopper is of sufficient size so that it will be delivering material to two or more of the molds at one time. As the molds reach the hopper 18 the attenuated portions $14^a$ of the core-bars are in said molds, and this permits a greater quantity of the material to enter the mold than would be the case were the core-bar the full size at this point.

The ends of the molds are formed by the plates 19 which form part of the stationary frame.

The hopper is provided at its rear portion with the opening 20, the size of which is controlled by the gate 21 which is adapted to slide up and down in suitable guides 22. This gate is preferably made in sections *a*, *b* and *c*, the number of sections depending upon the size of the block. To provide for the independent operation of each section, a screw-rod 23 is journaled to the upper end of each gate-section, said screw-rod having threaded engagement with a worm gear 24 mounted in the hopper-frame 26. By turning the screw-rods 23 it will be apparent that the sections *a*, *b* and *c* may be raised or lowered, if desired, and where it is desired to lower or raise all the sections simultaneously, I provide the worm-shaft 27 having the worms 28 which engage the worm-gears 24 on the screw-rods 23. The rods 23 have the locking pins $23^a$ which are adapted to hold the rods from turning when the gates are operated through the worm drive. The worm-shaft 27 is provided with the hand-wheel $27^a$.

An auxiliary material-feeding device, such as the roll 30, is provided, and where a roll is employed said roll is mounted on a shaft 31 which is journaled in suitable bearings 32 in the frame. The roll 30 is contained within the chamber 30ª formed with the curved wall 30ᵇ conforming generally to the circumference of said roll, so that any surplus material not required in the formation of the block, as will more fully appear, is carried up and delivered at the front of the roll to be again picked up or carried forward by said roll.

The roll 30 has the roughened or corrugated portions 33 on its circumference, and between said corrugated portions are the depressions 34. The roll 30 is driven by a suitable train of gears from the power shaft 2ª, as clearly illustrated in Fig. 2, the section being taken on the line 2—2 of Fig. 1. Shaft 2ª is driven by a motor or other power source not shown, and drives through worm 35 and worm wheel 36 a shaft 37 which has two gear teeth 38, which drives a train of gears to the roll 30, said gears being indicated by the numerals 39, 40 and 41, gear 41 being secured to the roll shaft 31. The gear teeth 38 on shaft 37 also drive a gear 42 on the shaft 43, said shaft having the gear 44 which drives through gears 45 and 46 the sprocket shaft 2.

A trowel-plate 47 is provided for leveling off and smoothing up the upper face of the block, as it passes from under the roll 30.

In the operation of the machine, the material from which the blocks are to be formed is introduced into the hopper 18, and is discharged therefrom into the molds as they come under the hopper, the attenuated portions 14ª of the core-bars being at the point where the material is first introduced into the molds, thereby permitting a greater quantity of material to enter the mold. The material completely fills the mold, and as the mold moves along the cross-sectional area of the core-bars gradually increases and the material is compacted by the action of said core-bars.

The gate 21 is adjusted to allow a certain quantity of material to pass through into position to be taken up or advanced by the roll 30 which is revolving in the direction of the arrow, Fig. 1. The corrugated portions 33 pick up or advance the material and deposit it on top of the material already in the mold, adding a certain amount thereto, and the action of the roll further tending to compact the material as it is delivered by said roll. The roll 30 is preferably driven at a higher rate of speed than the travel of the endless-conveyor 4, so that the material will be advanced to supply the forward portion of the mold with the additional material to insure that part of the block being as compact as the remaining portions. The depressions or recessed portions 34 of the roll coincide with the sides of the mold and are timed to meet the upper edges of the sides of the molds as they come around, so as not to cause interference. Any surplus not needed to make up the block is carried around by the roll and deposited in front of same to be again advanced as before.

In this manner I provide for the additions of material to the material already entering the mold from the hopper directly, and supply any deficiency which there may be which would result in the block not being properly compacted or of sufficient density. The amount of material which is supplied by the roll may be varied by the adjustment of the gate 21, or the material delivered to different portions of the block may be varied by adjusting any one of the sections $a$, $b$ and $c$ of the gate.

While I have illustrated and described my invention in connection with the making of cored or hollow building blocks, it is apparent that by dispensing with the core bar and providing imperforated side plates the machine is applicable for the making of solid blocks or bricks.

By the term "roughened" as used in the claims, I means any form of unevenness on the periphery of said roll which will advance additional material onto the material previously introduced into the mold, although the broad claims are intended to cover any means of doing this.

What I claim is:

1. In a machine for making cored blocks of plastic material, the combination of a mold having openings in its walls, a core-bar extending through said openings, means for moving said mold, a hopper above said mold, and communicating therewith, said hopper having an opening at its lower end, a gate controlling said opening, and a device beyond said gate adapted to feed additional material to said mold.

2. In a machine for making cored blocks of plastic material, the combination of a mold having openings in its walls, a core-bar extending through said openings, means for moving said mold, a hopper above said mold, and communicating therewith, said hopper having an opening at its lower end, a gate controlling said opening, and a roll beyond said gate having roughened portions on its periphery, and means for rotating said roll.

3. In a machine for making cored blocks of plastic material, the combination of a mold having openings in its walls, a core-bar extending through said openings, means for moving said mold, a hopper above said mold and communicating therewith, said hopper having an opening at the lower end thereof, a gate composed of sections controlling said opening, means for raising and lowering said sections independent of each other, and a device beyond said gate for feeding additional material to said mold.

4. In a machine for making cored blocks of plastic material, the combination of a mold having openings in its walls, a core-bar extending into said openings, means for moving said mold, means for delivering the bulk of the material to said mold, a roll beyond said first feeding means, and a material storage chamber for confining said roll, said roll having a roughened portion on its periphery and adapted to carry surplus material into said chamber.

5. In a machine for making cored blocks of plastic material, the combination of a mold having openings in its walls, a core-bar extending into said openings, means for moving said mold, means for delivering material to said mold, a roll beyond said first feeding means having roughened portions on its periphery, and a recessed portion formed between said roughened portions.

6. In a machine for making cored blocks of plastic material, the combination of a mold having openings in its walls, a core-bar extending into said openings, means for moving said mold, means for delivering material to said mold, a device beyond said first feeding means for feeding additional material to said mold, and a trowel-plate beyond said roll.

7. In a machine for making cored blocks of plastic material, the combination of a mold having openings in its walls, a core-bar extending into said openings, means for moving said mold, means for delivering material to said mold, a roll beyond said first feeding means for feeding additional material to said mold, and means for driving said roll at a higher rate of speed than the means for moving said mold.

8. In a machine for making cored blocks of plastic material, the combination of a mold having openings in its walls, a core-bar adapted to extend through said openings, means for moving said mold lengthwise with respect to said bar, and means for feeding material into said mold at a point intermediate the ends of the core bar, said core-bar having portions adjacent the said feeding means tapering from each end toward said point.

9. In a machine for forming blocks of plastic material, the combination of a mold having openings in its walls, a core bar adapted to extend through one of said openings and having a reduced portion within said mold, means for moving said mold lengthwise with respect to said bar and toward the thicker portion thereof, and means for feeding material to said mold at a point adjacent to the reduced portion of said bar.

In testimony whereof, I, the said GEORGE C. DEBAY, have hereunto set my hand.

GEORGE C. DEBAY.

Witnesses:
JOHN F. WILL,
HENRY HOLZ.